United States Patent
Carman

[11] 3,903,696
[45] Sept. 9, 1975

[54] HYDRAULIC ENERGY STORAGE TRANSMISSION

[76] Inventor: Vincent E. Carman, 10728 NE Halsey, Portland, Oreg. 97220

[22] Filed: Nov. 25, 1974

[21] Appl. No.: 526,540

[52] U.S. Cl. ............................. 60/414; 180/66 R
[51] Int. Cl.² ........................................... F15B 1/02
[58] Field of Search ............ 60/325, 371, 404, 408, 60/413, 414; 105/96.2; 180/66 R

[56] References Cited
UNITED STATES PATENTS

| | | | |
|---|---|---|---|
| 575,681 | 1/1897 | Clark | 180/66 R |
| 1,229,076 | 6/1917 | Hayes | 60/408 |
| 2,628,476 | 2/1953 | Grier | 60/413 X |
| 2,641,106 | 6/1953 | Jelinek | 60/371 X |
| 2,755,898 | 7/1956 | Bell | 60/414 X |

Primary Examiner—Edgar W. Geoghegan

[57] ABSTRACT

On a vehicle a hydraulic system to collect and to store energy upon braking of the vehicle the hydraulic system including an accumulator means, a hydraulic pump and motor means with the pump and motor means hydraulically connected together and mechanically connected to the vehicle wheels and the system including a reservoir of hydraulic fluid and conduit means to connect the reservoir and accumulator means and pump and motor means and operator means to selectively permit fluid flow in the system to store energy on braking of the vehicle and to release the stored energy to accelerate the vehicle.

4 Claims, 1 Drawing Figure

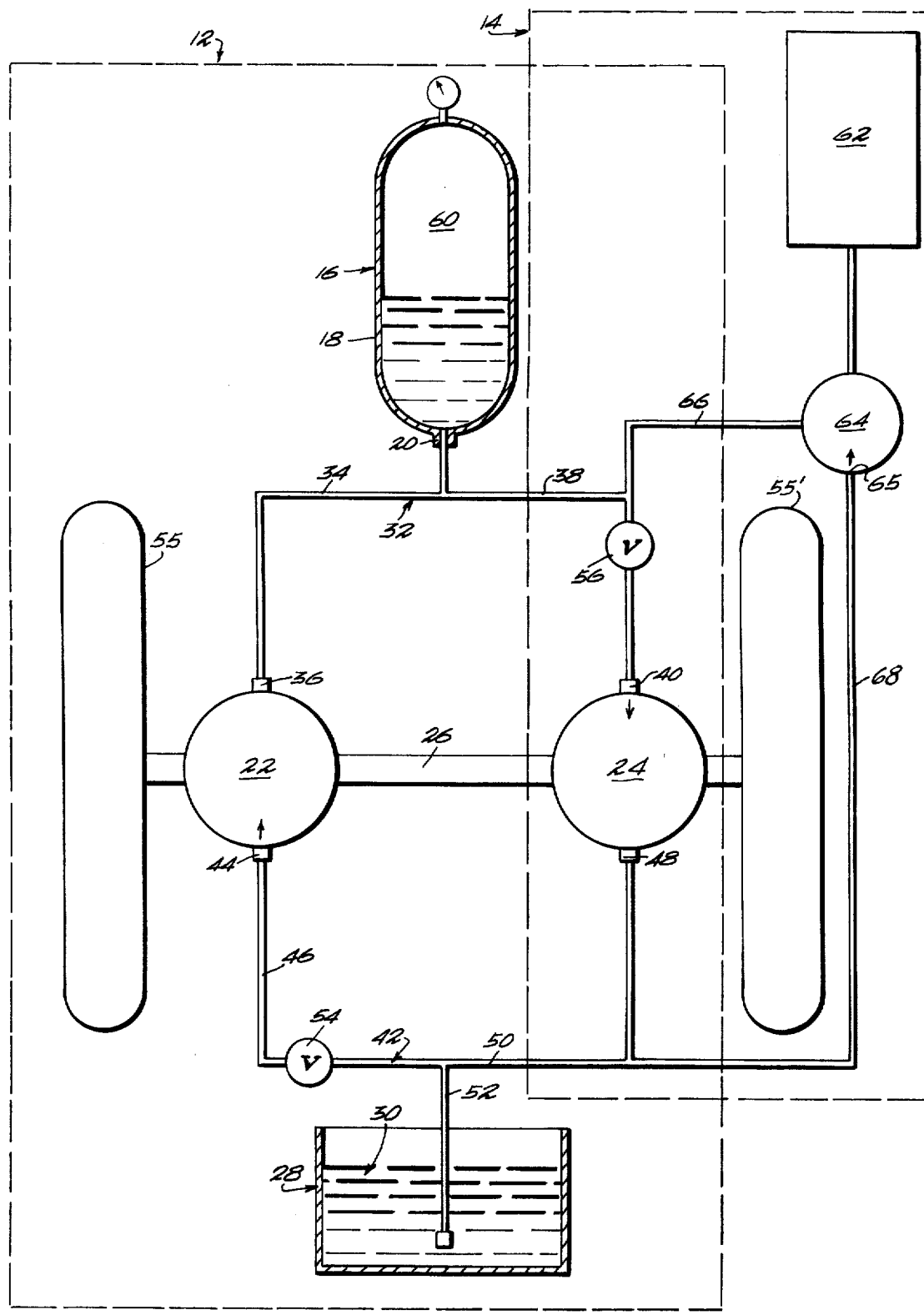

HYDRAULIC ENERGY STORAGE TRANSMISSION

BACKGROUND OF THE INVENTION

In the past, there have been numerous types of transmission systems and, in these systems, much energy is wasted in decelerating and accelerating. This instant invention is of a hydraulic system which is useful, by itself, or in parallel with a hydrostatic transmission system, as is made clear from the embodiment described hereinafter.

Generally speaking, it is an object of this invention to provide a hydraulic system which is useful for storing kinetic energy in decelerating which might otherwise be wasted and utilizing that energy to aid the primary power source in overcoming forces of inertia upon acceleration.

It is a general object of this invention to provide a simple and inexpensive means which is particularly adaptable for use in storing kinetic energy of a vehicle, whether it is a trailer or a tractor, or single unit vehicle.

DESCRIPTION OF THE DRAWING

The drawing illustrates in schematic form a hydraulic system according to the instant invention in parallel with a hydrostatic transmission system.

DESCRIPTION OF PREFERRED EMBODIMENT

Referring to the drawing, there is shown a hydraulic system generally designated by the numeral 12 and a hydrostatic transmission system generally designated by the numeral 14, which are, generally, in parallel with one another.

Referring first to the hydraulic system, it includes an accumulator means designated by the numeral 16 which comprises a receptacle defining structure the housing of which is designated by the numeral 18 and a port means designated by the numeral 20. The hydraulic system also includes a hydraulic pump means 22 and a hydraulic motor means 24, the pump and motor means being hydraulically connected with one another and said pump and motor means being journaled to a common shaft 26. Also the hydraulic system includes a reservoir 28 for the fluid which is generally designated by the numeral 30. First conduit means generally designated by the numeral 32 are provided and include a first branch designated by the numeral 34 which connects the port means 20 of the accumulator and the outlet 36 of the pump means 22 and a second branch 38 which connects the port means of the accumulator to the inlet port 40 of the motor means. The hydraulic system also includes a second conduit means generally designated by the numeral 42 which connects the reservoir 28 with the inlet 44 of the pump through a branch 46 and which connects the motor to the reservoir through a branch 50 which connects to the outlet of the port as at 48 and to the reservoir through a common portion of both branches which is designated by the numeral 52. To the shaft 26 there is a pair of wheels connected, as might be the case in automotive use but in any event which comprise a power take-off means and power input means. An operator means generally designated by the numeral 54, which may be a valve, is provided in the first branch 46 of the second conduit means as shown (or the first branch 34 of the first conduit means 32, not shown) to control volume flow between the reservoir and the pump means and a second operator means, which may be a valve, and which is generally designated by the numeral 56 is provided in the second branch 38 first conduit means 32 intermediate the port means of the accumulator and the inlet of the motor means to control fluid flow to said motor means.

In use, when the shaft is rotating by reason of an outside power source, the pump means, when the operator means 54 is open so that fluid may flow from the reservoir through the pump means, will cause fluid to enter into the receptacle 18 of the accumulator 16 in which a compressible gas designated by the numeral 60 is captivated, the gas, under the influence of this increasing pressure will be compressed and, subsequently, when the second operator means 56 is open and the first operator means 54 is closed, it will be released to flow to the motor means to cause the motor to rotate the shaft 26, returning to the reservoir. It is thus seen that depending upon the manipulation of the operator means 54 and 56 fluid flow through the hydraulic system may be controlled to work in harmony with a primary source to store some of the energy from the primary source which would otherwise be lost as heat while braking the vehicle to be released at a later time, which is particularly useful when it is desired to overcome inertia. A pressure gauge 70 may be provided to indicate the pressure in the reservoir and the stored energy quantity.

With further reference to the drawing, the hydrostatic power transmission system designated by the numeral 14 will now be described. The analogy may be made to a hydrostatic transmission system of an automobile or other vehicle which includes a prime power source or engine 62 which is in series with a hydraulic pump 64 and which in turn is in series with a motor, which in this case is the motor 24, so that when the engine drives the pump, the pump drives the motor. A conduit means designated by the numeral 66 connects the pump 64 to the branch 38 of the first conduit means 32 between the port means 20 of the accumulator 16 and the inlet of the motor as at 40; and the conduit means 68 connects the inlet 65 of the pump 64 of the hydrostatic transmission system to the outlet port 48 of the motor.

To the shaft 26, wheels indicated by the numerals 55 and 55' may be journaled for rotation such as the drive wheels of a vehicle. While the preferred embodiment described herein includes an external first valve control or operator means 54 and a second valve control 56, as described above it is within the spirit of this invention to employ a variable displacement pump and motor in the hydraulic system. Also the operator means 54 and 56 may be arranged to control a single unit hydraulic motor/pump or the pump and motor may be separate as shown.

What is claimed is:

1. On a wheeled vehicle, a hydraulic braking and accelerating system to selectively collect and store energy normally lost in braking the vehicle and to release the stored energy to aid in accelerating the vehicle, said system comprising:

an accumulator means to be hydraulically pressurized including a receptacle with port means, a hydraulic pump means and motor means with an inlet and an outlet, said pump and motor means being hydraulically connected to the accumulator means, said accumulator means being hydraulically between said pump means and said motor means, said pump and motor means having shaft means connected to wheels of the vehicle, a reservoir of hydraulic fluid, first conduit means to connect the accumulator means and the pump and motor means, and second conduit means to connect the reservoir and the pump and motor means, and first operator means for selective operation
  a. to permit fluid flow between the reservoir and the accumulator means through said pump means when the vehicle is being braked to store some braking energy in the accumulator means and
  b. to prohibit the flow when the vehicle is not being braked, second operator means for selective operation
  a. to permit fluid flow between the accumulator and reservoir through said motor means to release stored energy in the accumulator when the vehicle is being accelerated and
  b. to prohibit flow when the vehicle is not being accelerated.

2. The device as set forth in claim 1 wherein the pump means and the motor means are separate units.

3. The device as set forth in claim 2 wherein the system includes a hydrostatic power transmission system including a primary power source and hydrostatic pump means in series with said reservoir and said primary power source and said transmission system including third conduit means connecting said pump of said transmission system and said first conduit means intermediate said port means of said accumulator and the inlet of said motor means.

4. The device as set forth in claim 1 wherein said accumulator includes pressure sensing means exteriorly visible of said accumulator receptacle.

* * * * *